(12) United States Patent
Netsu et al.

(10) Patent No.: US 9,193,596 B2
(45) Date of Patent: Nov. 24, 2015

(54) REACTOR FOR PRODUCING POLYCRYSTALLINE SILICON, SYSTEM FOR PRODUCING POLYCRYSTALLINE SILICON, AND PROCESS FOR PRODUCING POLYCRYSTALLINE SILICON

(75) Inventors: Shigeyoshi Netsu, Niigata (JP); Kyoji Oguro, Niigata (JP); Takaaki Shimizu, Niigata (JP); Yasushi Kurosawa, Niigata (JP); Fumitaka Kume, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 925 days.

(21) Appl. No.: 13/496,002

(22) PCT Filed: Jul. 9, 2010

(86) PCT No.: PCT/JP2010/004478
§ 371 (c)(1),
(2), (4) Date: May 9, 2012

(87) PCT Pub. No.: WO2011/030492
PCT Pub. Date: Mar. 17, 2011

(65) Prior Publication Data
US 2012/0237429 A1  Sep. 20, 2012

(30) Foreign Application Priority Data
Sep. 14, 2009  (JP) .................................. 2009-211804

(51) Int. Cl.
*C01B 33/02*  (2006.01)
*B01J 19/00*  (2006.01)
(Continued)

(52) U.S. Cl.
CPC ................ *C01B 33/035* (2013.01); *C22C 1/02* (2013.01)

(58) Field of Classification Search
None
See application file for complete search history.

(56) References Cited

U.S. PATENT DOCUMENTS

2009/0188532 A1  7/2009  Endoh et al.

FOREIGN PATENT DOCUMENTS

| CN | 101497443 A | 8/2009 |
| EP | 0 090 321 A2 | 10/1983 |
| JP | 58-176924 | 10/1983 |

(Continued)

OTHER PUBLICATIONS

Combined Chinese Office Action and Search Report issued Aug. 27, 2013, in Chinese Patent Application No. 201080040883.9 with English translation of category of cited documents.

(Continued)

*Primary Examiner* — Melvin C Mayes
*Assistant Examiner* — Michael Forrest
(74) *Attorney, Agent, or Firm* — Oblon, McClelland, Maier & Neustadt, L.L.P.

(57) ABSTRACT

An inner wall 11 of a reactor 10 has a two-layer structure: an anticorrosive layer 11a comprising an alloy material having high anticorrosiveness is provided on the inner side of the reactor contacting a corrosive process gas, and a heat conductive layer 11b for efficiently conducting the heat within the reactor 10 from an inner wall surface to a coolant flow passage 13 is provided on the outer side of the reactor (outer-wall side). The anticorrosive layer 11a comprises an alloy material having a composition for which a value R, defined by R=[Cr]+[Ni]−1.5 [Si], is not less than 40% wherein [Cr] is a mass content (% by mass) of chromium (Cr), [Ni] is a mass content (% by mass) of nickel (Ni), and [Si] is a mass content (% by mass) of silicon (Si).

20 Claims, 4 Drawing Sheets

(51) Int. Cl.
*C01B 33/035* (2006.01)
*C22C 1/02* (2006.01)

(56) References Cited

FOREIGN PATENT DOCUMENTS

| JP | 63 74909 | | | 4/1988 | |
|---|---|---|---|---|---|
| JP | 08-259211 | A | * | 8/1996 | ............ C01B 33/029 |
| JP | 8 259211 | | | 10/1996 | |
| JP | 2004-137548 | | | 5/2004 | |
| JP | 2009-292675 | | | 12/2009 | |

OTHER PUBLICATIONS

Extended European Search Report issued Apr. 5, 2013, in European Patent Application No. 10815095.4.
Information Offer Form issued Apr. 26, 2013 in Japanese Patent Application No. 2009-211804 with English translation.
Kagakukogakubinran [Handbook of Chemical Engineering], Society for Chemical Engineers, May 10, 1968, 8 pages.
Decision to Grant issued Jun. 18, 2013 in Japanese Patent Application No. 2009-211804.
International Search Report Issued Aug. 31, 2010 in PCT/JP10/04478 Filed Jul. 9, 2010.

* cited by examiner

REACTOR FOR PRODUCING POLYCRYSTALLINE SILICON, SYSTEM FOR PRODUCING POLYCRYSTALLINE SILICON, AND PROCESS FOR PRODUCING POLYCRYSTALLINE SILICON

TECHNICAL FIELD

The present invention relates to a technique for producing polycrystalline silicon, and more specifically relates to a technique that can provide high-purity polycrystalline silicon by reducing contamination with dopant impurities from an inner wall of a reactor when polycrystalline silicon is deposited within the reactor.

BACKGROUND ART

As a method for producing high-purity polycrystalline silicon used as a raw material for monocrystalline silicon for production of a semiconductor, a Siemens method and a fluidized bed reactor method are known. The Siemens method is a method in which a raw material gas containing chlorosilane is contacted with a heated silicon core, and polycrystalline silicon is grown on the surface of the silicon core by a CVD (Chemical Vapor Deposition) method. The fluidized bed reactor method is a method in which monosilane or trichlorosilane as a raw material is fed and vapor-deposited in a fluidizing gas to obtain granular polysilicon.

In production of polycrystalline silicon, such a phenomenon is known that the quality of polycrystalline silicon is reduced by an impurity gas being discharged from an inner wall surface of a reaction vessel used for a deposition reaction of silicon and undesirably taken into the polycrystalline silicon. In the case where a steel reaction vessel is used, when the temperature of an inner wall surface of the steel reaction vessel is not less than 400° C., that inner wall surface of the steel reaction vessel which contacts a process gas prepared by diluting a silicon raw material gas such as trichlorosilane with hydrogen gas is gradually corroded. As a result, not only component elements of the steel that constitute the inner wall surface of the steel reaction vessel, but also impurity elements contained in the steel are discharged into the reaction atmosphere. If these impurity elements are dopant impurity elements such as phosphorus, boron, aluminum, and arsenic that act as an acceptor or a donor in silicon crystal, the impurity elements result in remarkable reduction of the quality of polycrystalline silicon.

In consideration of such problems, Japanese Patent Laid-Open No. 8-259211 (Patent Literature 1) discloses a technique for obtaining deposited high-purity silicon by depositing silicon within a reaction vessel formed with a material that hardly outgases.

Specifically, based on a knowledge that a heat-resistant alloy containing not less than 28% by weight of nickel hardly outgases at a temperature of not more than 600° C., the decomposition and reduction reaction of silanes are performed within a reactor vessel having an inner wall comprising a heat-resistant alloy containing not less than 28% by weight of nickel, thereby to further increase the purity of polycrystalline silicon to be obtained. Examples of the above-described "heat-resistant alloy containing not less than 28% by weight of nickel" include Incoloy 800, Inconel 600, Inconel 601, Incoloy 825, Incoloy 801, Hastelloy B, and Hastelloy C.

CITATION LIST

Patent Literature

Patent Literature 1: Japanese Patent Laid-Open No. 8-259211

SUMMARY OF INVENTION

Technical Problem

The polycrystalline silicon for production of a semiconductor is required to have extremely high purity. Recently, the total amount of dopant impurities needs to be not more than 100 ppt (ppt·atomic) in the atomic ratio. According to a series of tests conducted by the present inventors, however, it was found, for example, that even when polycrystalline silicon was deposited by the Siemens method within a reaction vessel having an inner wall surface comprising Hastelloy C, the amount of dopant impurities taken into the polycrystalline silicon undesirably increased as the temperature of the inner wall of the reaction vessel increased along with progress of the deposition reaction of polycrystalline silicon. Particularly, it was found that when the deposition reaction was performed on a condition in which a temperature of the inner wall of the reaction vessel exceeded 370° C., the total amount of dopant impurities taken into the polycrystalline silicon exceeded 100 ppt·atomic.

As the related art, Patent Literature 1 discloses cooling of a reactor by water in order to obtain anticorrosiveness of the reactor, but only describes a known technique of supplying water at a temperature around room temperature to cool the reactor. In order to reduce mixing of dopant impurities from the inner wall of the reactor when polycrystalline silicon is deposited within the reactor and to obtain high-purity polycrystalline silicon, the temperature needs to be managed at a temperature lower than the upper limit temperature conventionally proposed.

Then, an object of the present invention is to provide a technique for providing high-purity polycrystalline silicon and efficiently recovering heat fed to produce polycrystalline silicon.

Solution to Problem

In order to solve the problems above, a reactor for producing polycrystalline silicon according to the present invention includes an anticorrosive layer provided on the inner surface of an inner wall of a reactor, the anticorrosive layer comprising a first alloy material having a composition for which a value R, defined by R=[Cr]+[Ni]−1.5 [Si], is not less than 40%, wherein [Cr] is a mass content (% by mass) of chromium (Cr), [Ni] is a mass content (% by mass) of nickel (Ni), and [Si] is a mass content (% by mass) of silicon (Si); a cooling water flow passage that allows pressurized cooling water having a temperature not less than a standard boiling point to be circulated therethrough; and a heat conductive layer provided between the anticorrosive layer and the cooling water flow passage, the heat conductive layer comprising a second alloy material having heat conductivity higher than that of the first alloy material. Preferably, the value R is not less than 60%.

For example, respective mass contents (% by mass) of Cr, Ni, and Si contained in the first alloy material are as follows: [Cr] is in a range of 14.6 to 25.2% by mass, [Ni] is in a range of 19.6 to 77.5% by mass, and [Si] is in a range of 0.3 to 0.6% by mass.

The second alloy material is a single steel material or a clad steel material having several kinds of metals attached to each other, for example.

A system for producing polycrystalline silicon according to the present invention includes, the above reactor for producing polycrystalline silicon; and a temperature control mechanism capable of controlling the temperature of an innermost surface of the reactor at a temperature of not more than 370° C. when the polycrystalline silicon is deposited within the reactor.

A process for producing polycrystalline silicon according to the present invention comprises feeding a silicon raw material gas into the inside of a reactor to perform a deposition reaction of polycrystalline silicon in the state where the temperature of an inner surface of the inner wall of the reactor is controlled at a temperature of not less than 100° C. and not more than 370° C., wherein the innermost surface of the reactor comprises an alloy material having a composition for which a value R, defined by R=[Cr]+[Ni]−1.5 [Si], is not less than 40%, wherein [Cr] is a mass content (% by mass) of chromium (Cr), [Ni] is a mass content (% by mass) of nickel (Ni), and [Si] is a mass content (% by mass) of silicon (Si).

Preferably, the temperature of the innermost surface of the inner wall of the reactor is controlled at a temperature less than 300° C. by using the inner wall of the reactor comprising an alloy material having a composition for which the value R is not less than 60%.

In the present invention, as the anticorrosive layer provided on the inner surface of the inner wall of the reactor, the alloy material having a composition for which a value R, defined by R=[Cr]+[Ni]−1.5 [Si], is not less than 40% is used. Consequently, the present invention provides a technique for providing high-purity polycrystalline silicon by reducing contamination with dopant impurities from the inner wall of the reactor when polycrystalline silicon is deposited within the reactor.

Further, the heat conductive layer comprising the second alloy material having a heat conductivity higher than that of the first alloy material is provided between the anticorrosive layer and the cooling water flow passage. Thereby, the heat fed to produce polycrystalline silicon can be efficiently recovered through cooling water. The heat recovered through the cooling water can be reused as steam, for example.

DESCRIPTION OF EMBODIMENT

Hereinafter, with reference to the drawings, an embodiment according to the present invention will be described.

Figure 1:
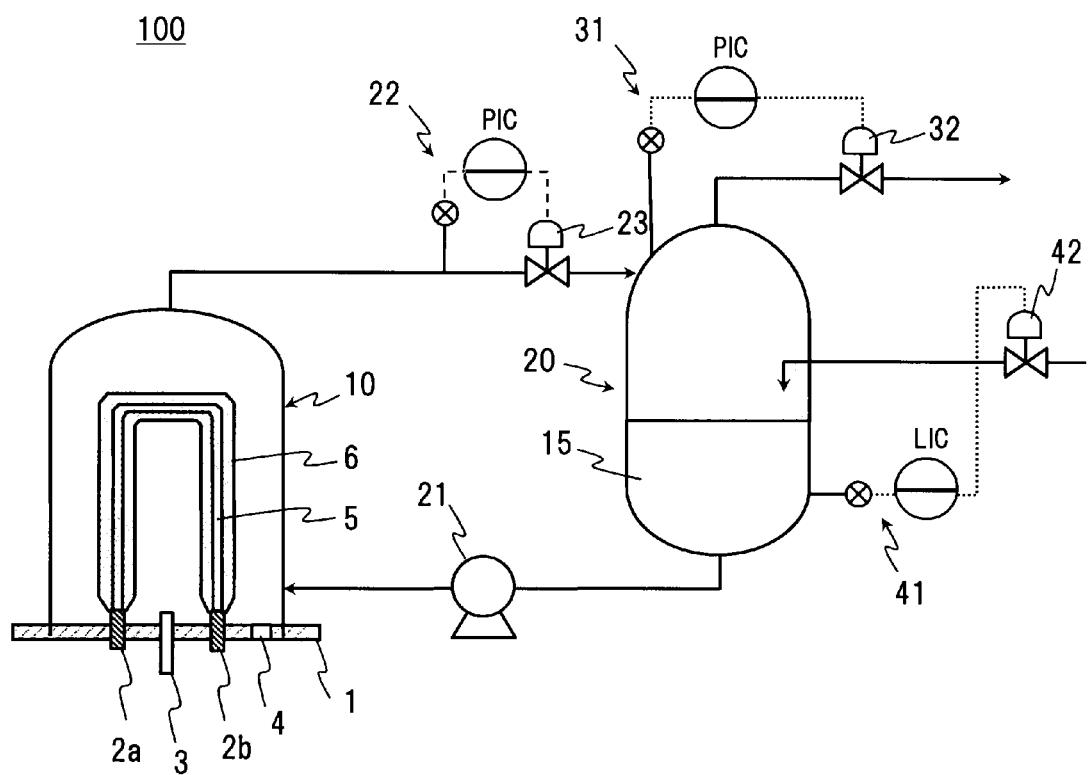
FIG. 1 is a drawing illustrating an example of a configuration of a polycrystalline silicon producing system according to the present invention.

FIG. 1 is a drawing illustrating an example of a configuration of a system for producing polycrystalline silicon according to the present invention. The drawing shows a polycrystalline silicon producing system 100 in which polycrystalline silicon is deposited by the Siemens method.

A reactor 10 is provided on a baseplate 1. Within the reactor 10, an approximately U-shaped silicon core 5 is set, and both ends of the silicon core 5 are connected to electrodes 2a and 2b, respectively, to be electrically conductive. A raw material gas such as trichlorosilane gas for depositing polycrystalline silicon and a process gas such as nitrogen gas and hydrogen gas are fed from a gas nozzle 3 into the reactor 10. By vapor deposition, polycrystalline silicon 6 is deposited on the surface of the silicon core 5 heated by feeding the current from the electrodes 2a and 2b. The gas within the reactor 10 is discharged from a vent 4.

Pressurized cooling water (hot water) 15 having a temperature not less than the standard boiling point and fed as a coolant from a steam drum 20 through a pressurized cooling water feeding pump 21 is fed from the lower portion of the reactor 10 to a flow passage through which the pressurized cooling water within the reactor can be circulated. The hot water 15 is discharged from the upper portion of the reactor 10. The pressure of the discharged hot water 15 is detected by a first pressure control unit provided downstream of the reactor 10, namely, a pressure indicator controller PIC 22. The pressure is controlled by controlling a degree of opening of a control valve 23, and reduced to a predetermined pressure.

The hot water 15 may be used for another heating application in the state where the hot water has high energy. In order to make steam easier to use, however, the hot water 15 having reduced pressure is flushed into the steam drum 20, and cooled while steam is generated. The pressure within the steam drum 20 increased along with the generation of the steam is detected by a second pressure control unit, namely, a pressure indicator controller PIC31. The steam is recovered through a control valve 32. The coolant recovered in the state where the energy per unit amount of the coolant is high can be reused as a heating source for another application as steam more valuable than warm water.

A level controller LIC41 detects the height of the solution level of the hot water 15 within the steam drum 20, and controls the degree of opening of the control valve 42 to feed an amount of pure water equivalent to or slightly larger than the amount of the hot water 15 lost by the recovery of the steam. The temperature of the hot water as the coolant is reduced when the hot water 15 is passed through the pressure control valve 23 of the first pressure control unit and flushed into the steam drum 20, and further cooled by feeding pure water through the control valve 42. However, the temperature of the hot water within the steam drum 20 is determined by control of the pressure by the second pressure control unit. The hot water 15 within the steam drum 20 having the thus-controlled temperature is circulated through the feeding pump 21 to the reactor 10 again.

Figure 2:
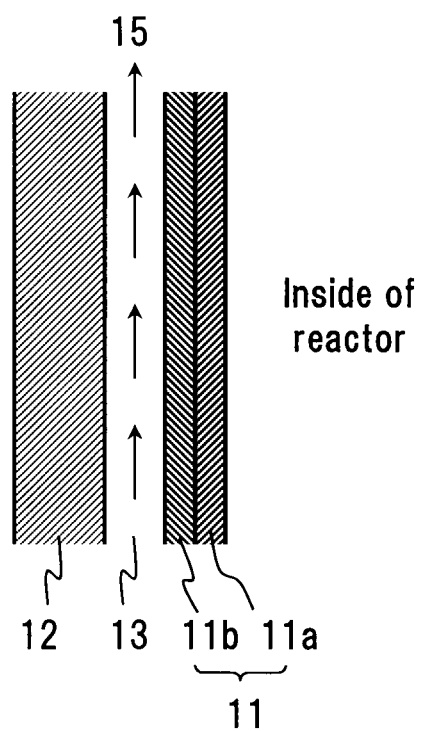
FIG. 2 is a sectional view illustrating a structure (an inner wall, an outer wall, and a coolant flow passage) of a wall portion of a reactor for producing polycrystalline silicon according to the present invention.

FIG. 2 is a sectional view illustrating the structure of the wall portion of the reactor 10 according to the present invention. The coolant flow passage 13 that has pressure resistance for circulating the hot water 15 as the coolant is, for example, spirally provided on an outer side of an inner wall 11, namely, between the inner wall 11 on the inner side of the reactor and an outer wall 12 on the outer side of the reactor. The hot water 15 is fed from the lower portion of the reactor 10 and discharged from the top of the reactor 10.

The inner wall 11 has a two-layer structure: an anticorrosive layer 11a comprising a highly anticorrosive alloy material is provided on the inner side of the reactor contacting a corrosive process gas, and a heat conductive layer 11b for efficiently conducting the heat within the reactor 10 from the inner wall surface to the coolant flow passage 13 is provided between the anticorrosive layer 11a and the cooling water flow passage 13.

The heat conductive layer 11b comprises an alloy material having a heat conductivity higher than that of the alloy material used in the anticorrosive layer 11a. For example, the heat conductive layer 11b comprises a material such as SB steel (carbon steel for boilers and pressure containers) and SGV steel (carbon steel for mid and normal temperature pressure containers). The heat conductive layer 11b is not limited to those comprising a single steel material, and may be those comprising a clad steel material having several kinds of metals applied to each other. The material of the outer wall 12 does not need to be determined in particular, and the same alloy material as that of the heat conductive layer 11b may be used, or stainless steel such as SUS304 can be used.

For the reason described later, the alloy material used for the anticorrosive layer is an alloy material having a composition for which a value R, defined by R=[Cr]+[Ni]−1.5 [Si], is not less than 40%, wherein [Cr] is a mass content (% by mass) of chromium (Cr), [Ni] is a mass content (% by mass) of nickel (Ni), and [Si] is a mass content (% by mass) of silicon (Si). Preferably, an alloy material having a value R of not less than 60% is selected.

The following describes a corrosiveness test which is the background that leads to the selection of the alloy material having the above composition.

The corrosiveness test was performed as follows: as a sample, a variety of alloy materials were cut into a test piece having a length of 30 mm, a width of 25 mm, and a thickness of 2 mm; the weight of the test piece was precisely weighed, and hung in a highly heated portion in a quartz reactor prepared as a test reactor; an exhaust gas discharged from the polycrystalline silicon reactor was introduced into the quartz reactor; and after a predetermined time at a predetermined temperature had passed, the weight of the test piece was weighed to determine change in the weight.

As a first condition selected, the temperature was 200° C. and the time was 9 days. As the second condition selected, the temperature was 300° C. and the time was 9 days. Under these first and second conditions, the corrosiveness test was performed.

First, an exhaust gas within the quartz reactor is replaced by nitrogen. Further, nitrogen is replaced by hydrogen. Part of the gas discharged from a Siemens type polycrystalline silicon reactor is introduced into the quartz reactor in which a test piece is hung in a highly heated portion. The exhaust gas discharged from the polycrystalline silicon reactor is a mixed gas containing $H_2$, HCl, and $SiHnCl_{4-n}$ (n=0 to 3) as principal components.

After the corrosiveness test was completed, the exhaust gas introduced into the quartz reactor was changed to hydrogen to cool the quartz reactor. Next, hydrogen was replaced with nitrogen, and the reactor was opened to the air. Then, the test piece was taken out from the quartz reactor, washed by water, and dried. The weight of the test piece was precisely weighed. As a result, under the first and second conditions, change in the weight was hardly found in any of the test pieces comprising the respective alloy materials. Namely, it was confirmed that at a temperature in the range of not less than 200° C. and not more than 300° C., the alloy materials that constitute the inner wall surface are hardly corroded.

Then, in order to accelerate corrosion of the alloy material, a temperature at 400° C. and a time of 19 days were selected as a third condition, and a temperature of 500° C. and a time of 19 days as a fourth condition. Again, the corrosiveness test was performed in the same manner as above except the temperature and the time.

Figure 3:
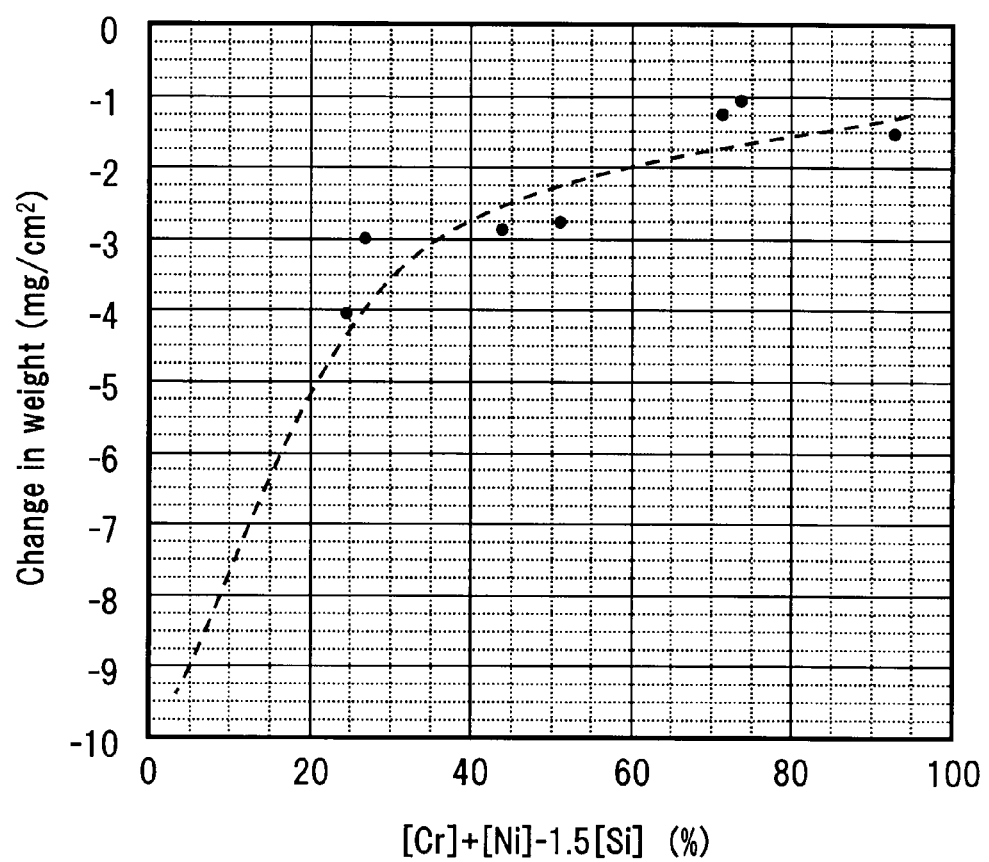
FIG. 3 is a drawing showing dependency of corrosiveness of a Cr—Ni—Si alloy material on a composition (mass content (% by mass): R=[Cr]+[Ni]−1.5 [Si]).

Table 1 and FIG. 3 show the results of the corrosiveness test performed under the third condition (temperature of 400° C., time: 19 days). Table 1 shows a specific composition of the alloy materials (kinds of steel) and change in the weight after the corrosiveness test. FIG. 3 is a graph of the result wherein the abscissa represents an alloy composition (R=[Cr]+[Ni]−1.5 [Si]) and the ordinate represents change in the weight after the corrosiveness test.

"NAR" is a registered trademark of Sumitomo Metal Industries, Ltd. "Incoloy" and "Inconel" are registered trademarks of Inco Limited. "Hastelloy" is a registered trademark of Haynes-Stellite Company. "Carpenter" is a registered trademark of Carpenter Technology Corporation.

TABLE 1

| Alloy material (steel type) | [Cr] (%) | [Ni] (%) | [Si] (%) | [Cr] + [Ni] − 1.5[Si] (%) | Change in weight (mg/cm²) |
|---|---|---|---|---|---|
| NAR-SN-1 | 17.2 | 13.9 | 4.3 | 24.7 | −4.05 |
| SUS-305B | 19.2 | 13.0 | 3.5 | 27.0 | −3.01 |
| SUS-310S | 25.2 | 19.6 | 0.5 | 44.1 | −2.87 |
| Incoloy 800 | 20.5 | 31.3 | 0.3 | 51.4 | −2.78 |
| Hastelloy C | 15.0 | 57 | 0.4 | 71.4 | −1.25 |
| NAR-25-50MTi | 24.9 | 49.8 | 0.6 | 73.8 | −1.07 |
| Inconel 600 | 14.6 | 77.5 | 0.37 | 92.7 | −1.53 |

As for a steel type in which the value of the relational expression in mass content (% by mass) among chromium, nickel, and silicon, R=[Cr]+[Ni]−1.5 [Si], is less than 40%, as apparent from Table 1 and FIG. 3, when this steel type is used as a material for the inner wall of the reactor, corrosion thereof is easily promoted in deposition of polycrystalline silicon within the reactor.

Namely, as the material for the anticorrosive layer provided in the inner wall of the reactor for producing polycrystalline silicon, the alloy material preferably has a value R of not less than 40%, and more preferably a value R of not less than 60%. In the corrosiveness test on the fourth condition (temperature of 500° C., time: 19 days), a more marked change in the weight was found in compared with the corrosiveness test on the third condition.

EXAMPLE

Based on the examination above, reactors were produced using a steel type that satisfies the condition of the value R of not less than 40%, i.e., SUS310S (value R: 41 to 46%) and Hastelloy C (value R: not less than 62%) as the anticorrosive layer for the inner wall. Using these reactors, polycrystalline silicon was actually deposited. Dependency of the concentration of dopant impurities in the obtained polycrystalline silicon rod on the temperature of the inner wall surface was examined.

While hydrogen gas and trichlorosilane gas as the principal raw material were fed from the gas nozzle 3 into each reactor 10 having the anticorrosive layer for the inner wall which anticorrosive layer comprised the steel type SUS310S and Hastelloy C, growth of a polycrystalline silicon rod was performed at a temperature of not less than 1000° C. and not more than 1100° C. to obtain a polycrystalline silicon rod having a diameter of 120 to 130 mm.

Figure 4:
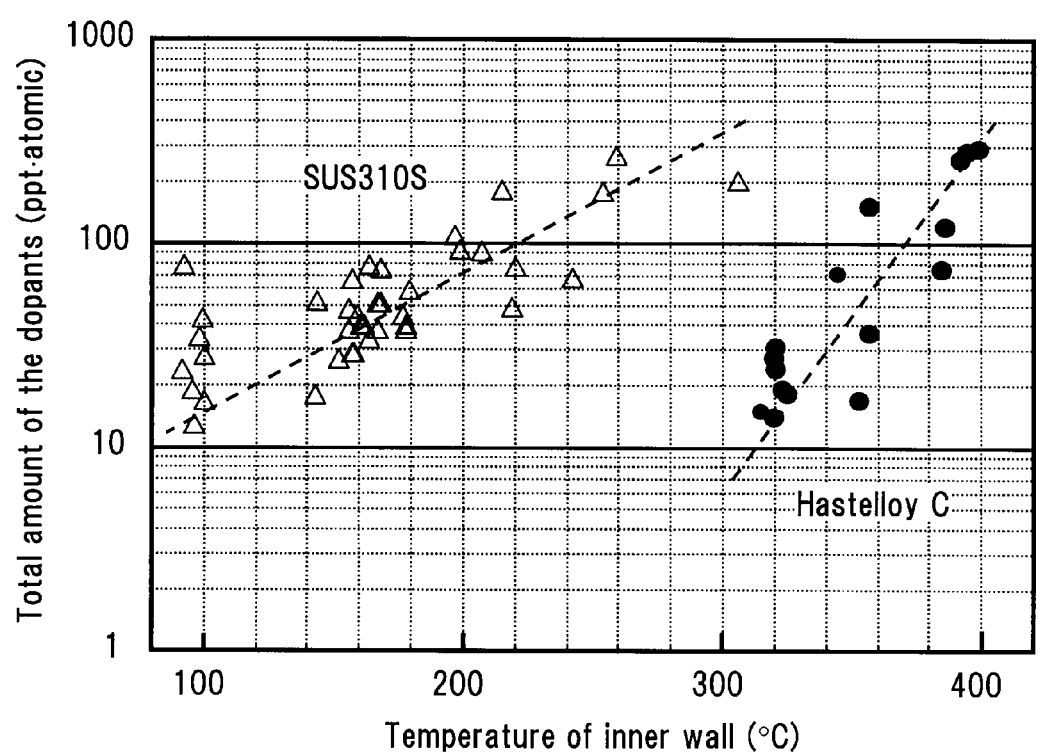
FIG. 4 is a drawing showing a relationship between a temperature of the inner wall surface on a coolant outlet end side immediately before a polycrystalline silicon deposition step is completed and a concentration of dopant impurities taken into polycrystalline silicon in a reactor having an inner wall comprising a Cr—Ni—Si alloy material, wherein the Cr—Ni—Si alloy material is SUS310S and Hastelloy C.

FIG. 4 is a drawing showing a relationship between the temperature of the inner wall surface (the abscissa) on the coolant outlet end side immediately before the polycrystalline silicon deposition step is completed and the concentration of dopant impurities taken into polycrystalline silicon in the respective reactors having the inner wall comprising a Cr—Ni—Si alloy material, i.e., SUS310S and Hastelloy C. The total amount of the dopants shown by the ordinate is the total amount of the dopants obtained by a photoluminescence analysis, and specifically, the sum of the contents of phosphorus, arsenic, boron, and aluminum.

Because of a practical demand in control of the resistivity during growth of the CZ single-crystal or FZ single-crystal used for the semiconductor, the total amount of the dopants in polycrystalline silicon is desirably not more than 100 atomic ppt. As shown in FIG. 4, in the case where SUS310S is used for the inner wall surface, by keeping the temperature of the inner wall surface at not more than 220° C., the total amount of the dopants of not more than 100 atomic ppt can be obtained in polycrystalline silicon. In the case where Hastelloy C is used for the inner wall surface, by keeping the temperature of the inner wall surface not more than 370° C., the total amount of the dopants not more than 100 atomic ppt can be obtained in polycrystalline silicon.

Further, within the reactor in which the anticorrosive layer of the inner wall is formed with a kind of steel that satisfies the condition that the value R is not less than 60%, polycrystalline silicon is deposited while the temperature of the inner wall surface is kept at not more than 300° C. Thereby, it can be expected that the total amount of dopants in polycrystalline silicon of not more than 10 atomic ppt is obtained.

Here, because the reactor 10 is cooled by the pressurized cooling water (hot water) 15 having a temperature higher than a standard boiling point, the temperature of the inner wall surface is controlled at a temperature of not less than 100° C.

Table 2 shows examples of alloy materials for which a value R, defined by R=[Cr]+[Ni]−1.5 [Si], is not less than 40% and which are preferable as the material for the anticorrosive layer provided in the inner wall of the reactor for producing polycrystalline silicon.

TABLE 2

| Alloy material (steel type) | [Cr] (%) | [Ni] (%) | [Si] (%) | [Cr] + [Ni] − 1.5[Si] (%) |
| --- | --- | --- | --- | --- |
| SUS310S | 24-26 | 19-22 | ≤1.5 | 41-46 |
| Carpenter 20 | 19-22 | 28-30 | ≤1 | 45-50 |
| Incoloy 800 | 18-23 | 28-35 | ≤0.5 | 45-57 |
| Hastelloy C | 14-17 | ≥50 | ≤1 | ≥62 |
| Inconel 600 | 14-17 | ≥72 | ≤0.5 | ≥85 |

Using the reactor according to the present invention, the deposition reaction of polycrystalline silicon is performed. The procedure is mainly as follows. First, the silicon core 5 is connected to the electrodes 2, and the reactor 10 is closely placed on the baseplate 1. Nitrogen gas is fed from the gas nozzle 3 to replace the air within the reactor 10 with nitrogen. The air and nitrogen within the reactor 10 are discharged from the vent 4.

After replacement of the air within the reactor 10 with a nitrogen atmosphere is started, the hot water 15 is fed to the coolant flow passage 13, and heating of the inside of the reactor 10 is started. After replacement of the air within the reactor 10 with a nitrogen atmosphere is completed, hydrogen gas is fed from the gas nozzle 3 instead of nitrogen gas to provide a hydrogen atmosphere within the reactor 10.

Next, using a heater not shown, the silicon core 5 is preheated to the temperature of not less than 250° C. to provide the conductivity such that the current efficiently flows. Subsequently, the current is supplied from the electrodes 2 to the silicon core 5 to heat the silicon core 5 to the temperature of not less than 900° C. Further, along with hydrogen gas, trichlorosilane gas is fed as a raw material gas, vapor deposition is performed on the silicon core 5 at the temperature in the range of not less than 900° C. and not more than 1200° C. to obtain the polycrystalline silicon 6. The unreacted gas and the by-product gas are discharged from the vent 4.

During a period of time from the start of heating the silicon core 5 to the step of the deposition reaction of the polycrystalline silicon 6 (or cooling of the polycrystalline silicon rod after the deposition reaction step is completed), the hot water 15 is fed as the coolant to cool the reactor 10. At least during the deposition reaction of the polycrystalline silicon 6, the temperature of the inner wall surface of the reactor 10 is kept at the temperature of not more than 370° C. by the temperature control mechanism described below.

Namely, the temperature control mechanism may further include a thermometer for measuring the temperature of the innermost surface of the reactor, and control the temperature of the innermost surface of the reactor based on the measured temperature using a control mechanism for determining the temperature of the coolant and the amount of the coolant to be circulated. For practical production, however, preferable is a system that monitors the heat balance within the reactor and in the cooling system, and controls the temperature of the innermost surface of the reactor by adjusting the amount of the hot water to be circulated and the temperature of the hot water in the cooling system.

The mechanism for controlling a temperature of an inner surface of a reactor according to the heat balance uses a method in which the temperature of an inner surface of a reactor is determined from the heat balance obtained from the basic data at the time of designing the system, i.e., the amount of electricity to be applied to the silicon core 5, the amounts and temperatures of hydrogen and silane gases to be introduced, the surface temperature of the polycrystalline silicon 6 that is growing, the heat conductivity of the material for the reactor, the inlet temperature and outlet temperature of the hot water and the amount of the hot water to be circulated, and the like, and the inlet temperature of the hot water and the amount of the hot water to be circulated in the cooling system are adjusted to control the temperature of the innermost surface of the reactor in the control range of the temperature. Simply, the temperature of the innermost surface of the reactor can be estimated from the heat conductivity and thickness of the material for the reactor, the inlet temperature and outlet temperature of the hot water, and the amount of the hot water to be circulated, and controlled by the temperature of the cooling water to be fed and/or the amount of the cooling water to be circulated.

The temperature of the hot water 15 fed as the coolant that cools the reactor 10 is set in the range of more than 100° C. exceeding the standard boiling point and less than 200° C. In order to prevent boiling in the heat removing surface boundary film of the heat conductive layer 11b, the pressure of the hot water 15 is controlled at the pressure exceeding the vapor pressure at the boundary film temperature.

The hot water 15 having a controlled pressure is fed by the hot water feeding pump 21 from the lower portion of the reactor 10. The hot water 15 is passed through the coolant flow passage 13 contacting the heat conductive layer 11b to cool the inner wall 11, and heated by the heat conductive layer 11b to increase the temperature of the hot water, and discharged from the upper portion of the reactor 10.

After the polycrystalline silicon 6 is grown to have a desired diameter, the raw material gas and the current fed to the polycrystalline silicon 6 are stopped in this order, and the temperature of the inside of the reactor 10 is reduced. After the temperature of the inside of the reactor 10 is sufficiently reduced, the hot water 15 is switched to cool water, and the reactor 10 is cooled to the temperature around room temperature. Finally, the atmosphere within the reactor 10 is replaced from hydrogen to nitrogen, the reactor 10 is opened to the air, and the grown polycrystalline silicon 6 is extracted.

INDUSTRIAL APPLICABILITY

In the present invention, as the material for the anticorrosive layer provided on that the inner side of the inner wall of the reactor, the first alloy material having a composition for which the value R, defined by R=[Cr]+[Ni]−1.5 [Si], is not less than 40% is used. Thereby, contamination with dopant impurities from the inner wall of the reactor when polycrystalline silicon is deposited within the reactor can be reduced. Moreover, the heat conductive layer comprising the second alloy material having a heat conductivity higher than that of the first alloy material is provided between the anticorrosive layer and the cooling water flow passage. This makes it possible to provide a technique in which the heat fed to produce polycrystalline silicon can be efficiently recovered through the cooling water.

REFERENCE SIGNS LIST

1 Baseplate
2a, 2b Electrode
3 Gas nozzle
4 Vent
5 Silicon core
6 Polycrystalline silicon
10 Reactor (reaction vessel)
11 Inner wall
11a Anticorrosive layer
11b Heat conductive layer
12 Outer wall
13 Coolant flow passage
15 Hot water
20 Steam drum
21 Hot water feeding pump
22 Pressure indicator controller
23 Control valve
31 Pressure indicator controller
32 Control valve
41 Level controller
42 Control valve
100 Polycrystalline silicon producing system

The invention claimed is:

1. A process for producing polycrystalline silicon comprising:
feeding a silicon raw material gas into a reactor, and
performing a deposition reaction of polycrystalline silicon in a state where a temperature of an inner surface of an inner wall of the reactor is controlled at a temperature of not less than 100° C. and not more than 370° C., wherein the inner surface comprises an alloy material having a composition for which a value R, defined by R=[Cr]+[Ni]−1.5 [Si], is not less than 40%, wherein [Cr] is a mass content of chromium in mass %, [Ni] is a mass content of nickel in mass %, and [Si] is a mass content of silicon in mass %.

2. The process of claim 1, wherein the value R is not less than 60%, and the temperature of the inner surface of the inner wall of the reactor is controlled at a temperature less than 300° C.

3. A reactor comprising:
an anticorrosive layer provided on an inner surface of an inner wall, the anticorrosive layer comprising a first alloy material having a composition for which a value R, defined by R=[Cr]+[Ni]−1.5 [Si], is not less than 40% wherein [Cr] is a mass content of chromium in mass %, [Ni] is a mass content of nickel in mass %, and [Si] is a mass content of silicon in mass %;
a cooling water flow passage that allows pressurized cooling water having a temperature not less than a standard boiling point to be circulated therethrough; and
a heat conductive layer provided between the anticorrosive layer and the cooling water flow passage, the heat conductive layer comprising a second alloy material having a heat conductivity higher than that of the first alloy material.

4. The reactor of claim 3, wherein the value R is not less than 60%.

5. The reactor of claim 4, wherein [Cr] is in a range of 14.6 to 25.2% by mass, [Ni] is in a range of 19.6 to 77.5% by mass, and [Si] is in a range of 0.3 to 0.6% by mass.

6. The reactor of claim 4, wherein the second alloy material is a single steel material.

7. The reactor of claim 4, wherein the second alloy material is a clad steel material having several kinds of metals attached to each other.

8. The reactor of claim 3, wherein [Cr] is in a range of 14.6 to 25.2% by mass, [Ni] is in a range of 19.6 to 77.5% by mass, and [Si] is in a range of 0.3 to 0.6% by mass.

9. The reactor of claim 8, wherein the second alloy material is a single steel material.

10. The reactor of claim 8, wherein the second alloy material is a clad steel material having several kinds of metals attached to each other.

11. The reactor of claim 3, wherein the second alloy material is a single steel material or a clad steel material having several kinds of metals attached to each other.

12. The reactor of claim 3, wherein [Cr] is in a range of 24 to 26% by mass, [Ni] is in a range of 19 to 22% by mass, and [Si] is in a range of 0.3 to 1.5% by mass.

13. The reactor of claim 3, wherein [Cr] is in a range of 19 to 22% by mass, [Ni] is in a range of 28 to 30% by mass, and [Si] is in a range of 0.3 to 1.0% by mass.

14. The reactor of claim 3, wherein [Cr] is in a range of 18 to 23% by mass, [Ni] is in a range of 28 to 35% by mass, and [Si] is in a range of 0.3 to 0.5% by mass.

15. The reactor of claim 3, wherein [Cr] is in a range of 14 to 17% by mass, [Ni] is greater than or equal to 50% by mass, and [Si] is in a range of 0.3 to 0.6% by mass.

16. The reactor of claim 3, wherein [Cr] is in a range of 14 to 17% by mass, [Ni] is greater than or equal to 72% by mass, and [Si] is in a range of 0.3 to 0.5% by mass.

17. The reactor of claim 3, wherein the second alloy material is a single steel material.

18. The reactor of claim 3, wherein the second alloy material is a clad steel material having several kinds of metals attached to each other.

19. A system for producing polycrystalline silicon comprising:
the reactor of claim 3; and
a temperature control mechanism capable of controlling a temperature of the inner surface of the inner wall at a temperature of not more than 370° C. when the polycrystalline silicon is deposited within the reactor.

20. A system for producing polycrystalline silicon comprising:
the reactor of claim 4; and a temperature control mechanism capable of controlling a temperature of the inner surface of the inner wall at a temperature of not more than 370° C. when the polycrystalline silicon is deposited within the reactor.

* * * * *